US012573151B2

(12) United States Patent
Chang et al.

(10) Patent No.: US 12,573,151 B2
(45) Date of Patent: Mar. 10, 2026

(54) PERSONALIZED DEFORMABLE MESH BY FINETUNING ON PERSONALIZED TEXTURE

(71) Applicant: QUALCOMM Incorporated, San Diego, CA (US)

(72) Inventors: Wei-Lun Chang, Hsinchu (TW); Ke-Li Cheng, San Diego, CA (US); Michel Adib Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 18/469,453

(22) Filed: Sep. 18, 2023

(65) Prior Publication Data

US 2025/0095299 A1 Mar. 20, 2025

(51) Int. Cl.
G06T 17/20 (2006.01)
G06T 15/04 (2011.01)

(52) U.S. Cl.
CPC ............ G06T 17/205 (2013.01); G06T 15/04 (2013.01)

(58) Field of Classification Search
CPC .............................. G06T 17/205; G06T 15/04
USPC .......................................................... 345/419
See application file for complete search history.

(56) References Cited

U.S. PATENT DOCUMENTS

| | | | | |
|---|---|---|---|---|
| 11,222,466 B1* | 1/2022 | Naruniec | ............... | G06N 3/088 |
| 2017/0024921 A1* | 1/2017 | Beeler | .................... | G06T 13/40 |
| 2021/0358144 A1* | 11/2021 | Shanmuganathan | .... | G06N 3/04 |
| 2021/0390770 A1* | 12/2021 | Kuo | ..................... | G06V 40/165 |
| 2022/0108422 A1* | 4/2022 | Choi | ...................... | G06T 17/20 |
| 2022/0172421 A1* | 6/2022 | Moschoglou | .......... | G06T 15/00 |
| 2022/0237869 A1* | 7/2022 | Takeda | .................... | G06N 3/08 |
| 2022/0374649 A1* | 11/2022 | Naruniec | ............. | G06V 10/774 |
| 2023/0031750 A1* | 2/2023 | Li | ........................... | G06T 17/20 |
| 2023/0062756 A1* | 3/2023 | Takeda | .................... | G06T 7/251 |
| 2024/0221316 A1* | 7/2024 | Gorodissky | .......... | G06V 40/174 |

* cited by examiner

*Primary Examiner* — Jin Ge
(74) *Attorney, Agent, or Firm* — Polsinelli LLP/QUALCOMM Incorporated

(57) ABSTRACT

Techniques and systems are provided for generating a three-dimensional facial model. For instance, a process can include: obtaining a frame, the frame including a face; obtaining a mesh 3D model of the face; generating facial texture information associated with the face based on the frame and the mesh 3D model; generating, based on the facial texture information, displacement map information; and applying the displacement map information to the mesh 3D model to generate a finetuned mesh 3D model.

30 Claims, 9 Drawing Sheets

600

Obtain A Frame, The Frame Including A Face
602

Obtain A Mesh 3D Model Of The Face
604

Generate Facial Texture Information Associated With The Face Based On The Frame And The Mesh 3D Model
606

Generate, Based On The Facial Texture Information, Displacement Map Information
608

Apply The Displacement Map Information To The Mesh 3D Model To Generate A Finetuned Mesh 3D Model
610

PERSONALIZED DEFORMABLE MESH BY FINETUNING ON PERSONALIZED TEXTURE

FIELD

The present disclosure generally relates to systems and techniques for generating three-dimensional (3D) models. For example, aspects of the present disclosure relate to generating enhancing personalized deformable meshes by finetuning on personalized textures for 3D models (e.g., 3D morphable models), such as for faces or other objects.

BACKGROUND

Many devices and systems allow a scene to be captured by generating frames (also referred to as images) and/or video data (including multiple images or frames) of the scene. For example, a camera or a computing device including a camera (e.g., a mobile device such as a mobile telephone or smartphone including one or more cameras) can capture a sequence of frames of a scene. The frames and/or video data can be captured and processed by such devices and systems (e.g., mobile devices, IP cameras, etc.) and can be output for consumption (e.g., displayed on the device and/or other device). In some cases, the frame and/or video data can be captured by such devices and systems and output for processing and/or consumption by other devices.

A frame can be processed (e.g., using object detection, recognition, segmentation, etc.) to determine objects that are present in the frame, which can be useful for many applications. For instance, a model can be determined for representing an object in a frame and can be used to facilitate effective operation of various systems. Examples of such applications and systems include augmented reality (AR), robotics, automotive and aviation, three-dimensional scene understanding, object grasping, object tracking, in addition to many other applications and systems.

SUMMARY

Systems and techniques are described herein for generating a textured a three-dimensional (3D) facial model. In one illustrative example, a method for generating a three-dimensional facial model, the method comprising: obtaining a frame, the frame including a face; obtaining a mesh 3D model of the face; generating facial texture information associated with the face based on the frame and the mesh 3D model; generating, based on the facial texture information, displacement map information; and applying the displacement map information to the mesh 3D model to generate a finetuned mesh 3D model.

As another example, an apparatus for generating a three-dimensional facial model is provided. The apparatus includes at least one memory and at least one processor coupled to the at least one memory. The at least one processor being configured to: obtain a frame, the frame including a face; obtain a mesh 3D model of the face; generate facial texture information associated with the face based on the frame and the mesh 3D model; generate, based on the facial texture information, displacement map information; and apply the displacement map information to the mesh 3D model to generate a finetuned mesh 3D model.

In another example, a non-transitory computer-readable medium having stored thereon instructions is provided. The instructions, when executed by at least one processor, cause the at least one processor to: obtain a frame, the frame including a face; obtain a mesh 3D model of the face; generate facial texture information associated with the face based on the frame and the mesh 3D model; generate, based on the facial texture information, displacement map information; and apply the displacement map information to the mesh 3D model to generate a finetuned mesh 3D model.

As another example, an apparatus for generating a three-dimensional facial model is provided. The apparatus includes: means for obtaining a frame, the frame including a face; means for obtaining a mesh 3D model of the face; means for generating facial texture information associated with the face based on the frame and the mesh 3D model; means for generating, based on the facial texture information, displacement map information; and means for applying the displacement map information to the mesh 3D model to generate a finetuned mesh 3D model.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
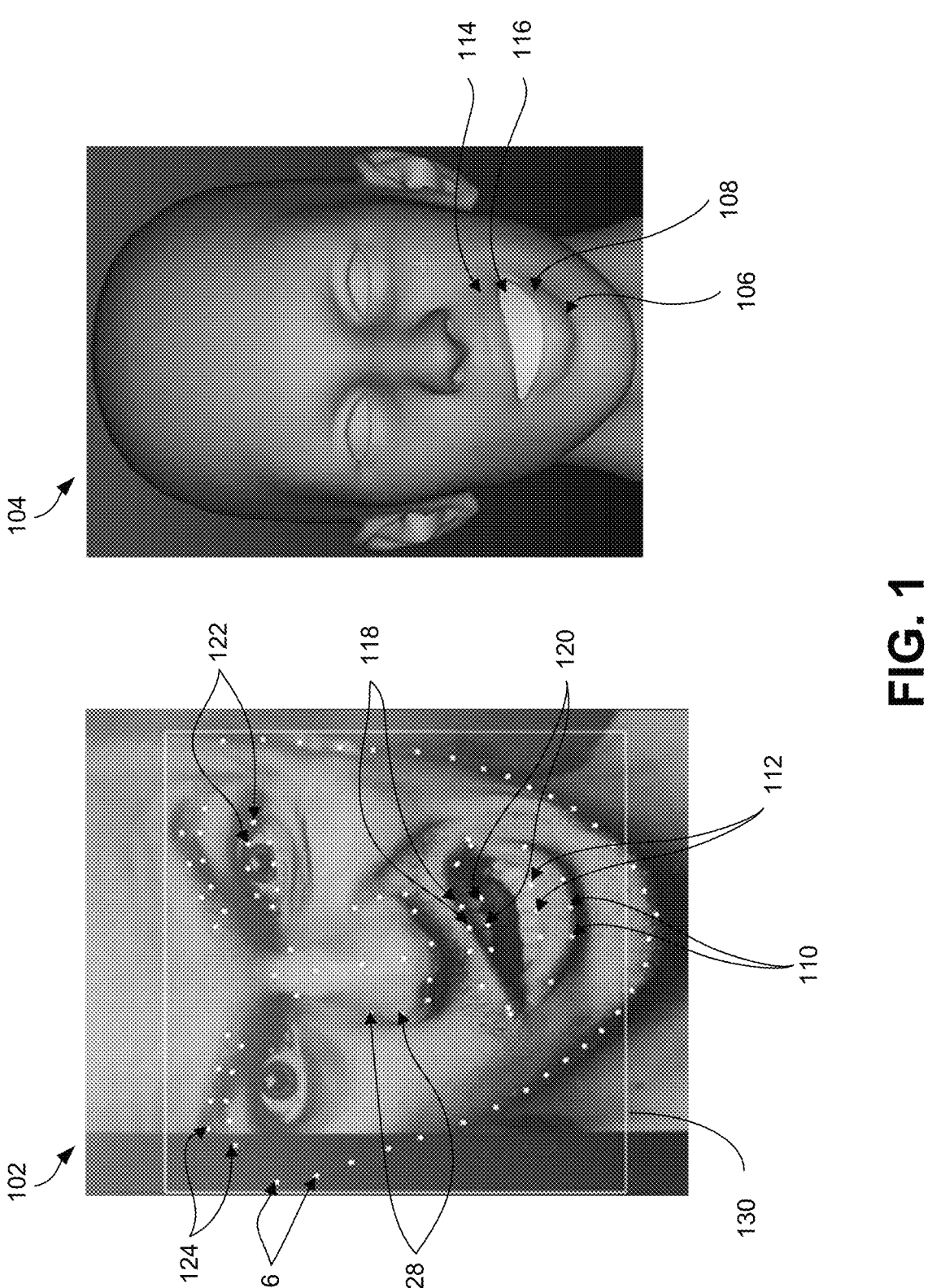
FIG. 1 is a block diagram illustrating an architecture of an image capture and processing system, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The generation of three-dimensional (3D) models for physical objects can be useful for many systems and applications, such as for extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view images (also referred to as frames) that include an integration of artificial or virtual graphics with the user's natural surroundings. AR applications allow real images to be processed to add virtual objects to the images or to display virtual objects on a see-through display (so that the virtual objects appear to be overlaid over the real-world environment). AR applications can align or register the virtual objects to real-world objects (e.g., as observed in the images) in multiple dimensions. For instance, a real-world object that exists in reality can be represented using a model that resembles or is an exact match of the real-world object. In one example, a model of a virtual airplane representing a real airplane sitting on a runway may be presented by the display of an AR device (e.g., AR glasses, AR head-mounted display (HMD), or other device) while the user continues to view his or her natural surroundings through the display. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

There is an increasing number of applications that use face data (e.g., for XR systems, for 3D graphics, for security, among others), leading to a large demand for systems with the ability to generate detailed 3D face models (as well as 3D models of other objects) in an efficient and high-quality manner. There also exists a large demand for generating 3D models of other types of objects, such as 3D models of vehicles (e.g., for autonomous driving systems), 3D models of room layouts (e.g., for XR applications, for navigation by devices, robots, etc.), among others. Generating a detailed 3D model of an object (e.g., a 3D face model) typically requires expensive equipment and multiple cameras in an environment with controlled lighting, which hinders large-scale data collection.

Performing 3D object reconstruction (e.g., to generate a 3D model of an object, such as a face model) from one or more images can be challenging. Using a face as an illustrative example of a 3D object, 3D face reconstruction can be difficult based on the need to reconstruct the face geometry (e.g., shape) and the facial expression. In addition, it can be difficult to accurately reconstruct facial expressions for portions of the face that can experience high variations in appearance. In one illustrative example, the eyes of a face can be moved to extreme gaze directions (e.g., looking for to one side, crossing eyes, or the like). In another illustrative example, the upper and lower lips of the mouth of a face are controlled by muscles that allow a large variety of difficult to reconstruct mouth shapes (e.g., smiling, frowning, baring teeth, twisting lips, etc.). In some traditional 3D modeling systems, generating textures and mesh fitting may be performed independently and possibly concurrently (e.g., in parallel) to generate/deform a mesh model to represent a user, such as for an avatar. However, separating the texture generation and mesh fitting may limit a quality of such generated avatars.

Systems, apparatuses, electronic devices, methods (also referred to as processes), and computer-readable media (collectively referred to herein as "systems and techniques") are described herein for a personalized, deformable, mesh by finetuning on a personalized texture. For example, it may be useful to to integrate texture generation and mesh fitting so that limitations, for example, to mesh fitting, may be compensated in part by the texture generation, and/or vice versa. For example, a 3D modeling system may be structured such that a machine learning model, such as a texture engine, may be used to produce a facial texture based on an input image and UV attributes of a rough mesh (e.g., neutral mesh). This facial texture, along with the UV attributes, may be input to another machine learning model and used to generate a displacement map. This displacement map may then be used to distort the rough mesh to finetune the rough mesh. The facial texture may then be applied to the finetuned mesh to Polsinelli Ref. No. 094922-765286 generate a personalized textured 3D model of a face based on the input image. In some cases, rather than generating a facial texture and then inputting the finished facial texture into another machine learning model for generating the displacement may, the machine learning model for generating the facial texture and the machine learning model for generating the displacement map may be configured to exchange intermediate data from layers of the machine learning models.

The systems and techniques described herein provide advantages over existing solutions. For example, using the head pose and location information to verify an initiated data transfer can allow for a more natural way to interact with an XR system as compared to bulky hand controllers using motions and/or actions that a user may easily and naturally perform when sharing information. Moreover, the techniques provide a second factor to help positively identify a target device as well as avoid potential fraud by detecting a motions and/or actions that is relatively unlikely to occur absent deliberate actions.

Various aspects of the application will be described with respect to the figures.

As illustrated in FIG. 1, white dots overlaid on a 2D facial image 102 can represent a projection of 3D vertices of a 3D facial model 104 back onto the original 2D facial image 102 used to generate the 3D facial model 104. For instance, in the illustration of FIG. 1, points corresponding to 3D vertices of major features of the 3D facial model (which can be referred to as landmarks or 2D landmarks) are depicted as white dots. As shown, landmarks 110, 112, 118, 120, 122, 124, 126, 128 are included for the outlines of lips, nose, mouth, eyes, eyebrows, nose, among others. Although the 3D facial model 104 may contain a much larger number of vertices, for purposes of illustration, only a small number of projected 3D vertices corresponding to the above listed facial features are shown. In the illustrated example of FIG. 1, landmarks corresponding to the inner contour 108 of the lower lip of the 3D facial model 104 projected onto a 2D image can include landmarks 112. Similarly, the landmarks corresponding to the outer contour 106 of the lower lip of the 3D facial model 104 can include landmarks 110.

FIG. 1 also illustrates the outer contour 114 and inner contour 116 of the upper lip of the 3D facial model 104. In some examples, landmarks corresponding to the outer contour 114 of the upper lip can include landmarks 118 and 124 and landmarks corresponding to the inner contour 116 of the upper lip can include landmarks 120. Additional landmarks projected from the 3D facial model 104 can include landmarks 122 corresponding to the left eye, landmarks 124 corresponding to the right eyebrow, landmarks 126 corresponding to the overall face outline, and landmarks 128 corresponding to the nose. As noted above, each of the landmarks (e.g., of the outer contour 114, the inner contour 116, landmarks 120, landmarks 122, landmarks 124, landmarks 126, and landmarks 128) can result from a projection of the 3D facial model 104 onto the 2D facial image 102.

FIG. 1 illustrates the 2D facial image 102 and the corresponding 3D facial model 104 generated from the 2D facial image 102 using a 3D morphable model (3DMM). In some aspects, the 3D facial model 104 can include a representation of a facial expression in the 2D facial image 102. In one illustrative example, the facial expression representation can be formed from blendshapes. Blendshapes can semantically represent movement of muscles or portions of facial features (e.g., opening/closing of the jaw, raising/lowering of an eyebrow, opening/closing eyes, etc.). In some cases, each blendshape can be represented by a blendshape coefficient paired with a corresponding blendshape vector.

In some examples, the 3D facial model 104 can include a representation of the facial shape in the 2D facial image 102. In some cases, the facial shape can be represented by a facial shape coefficient paired with a corresponding facial shape vector. In some implementations a 3D model engine (e.g., a machine learning model) can be trained (e.g., during a training process) to enforce a consistent facial shape (e.g., consistent facial shape coefficients) for a 3D facial model regardless of a pose (e.g., pitch, yaw, and roll) associated with the 3D facial model. For example, when the 3D facial model is rendered into a 2D image for display, the 3D facial model can be projected onto a 2D image using a projection technique. While a 3D model engine that enforces a consistent facial shape independent of pose, the projected 2D image may have varying degrees of accuracy based on the pose of the 3D facial model captured in the projected 2D image.

Figure 2:
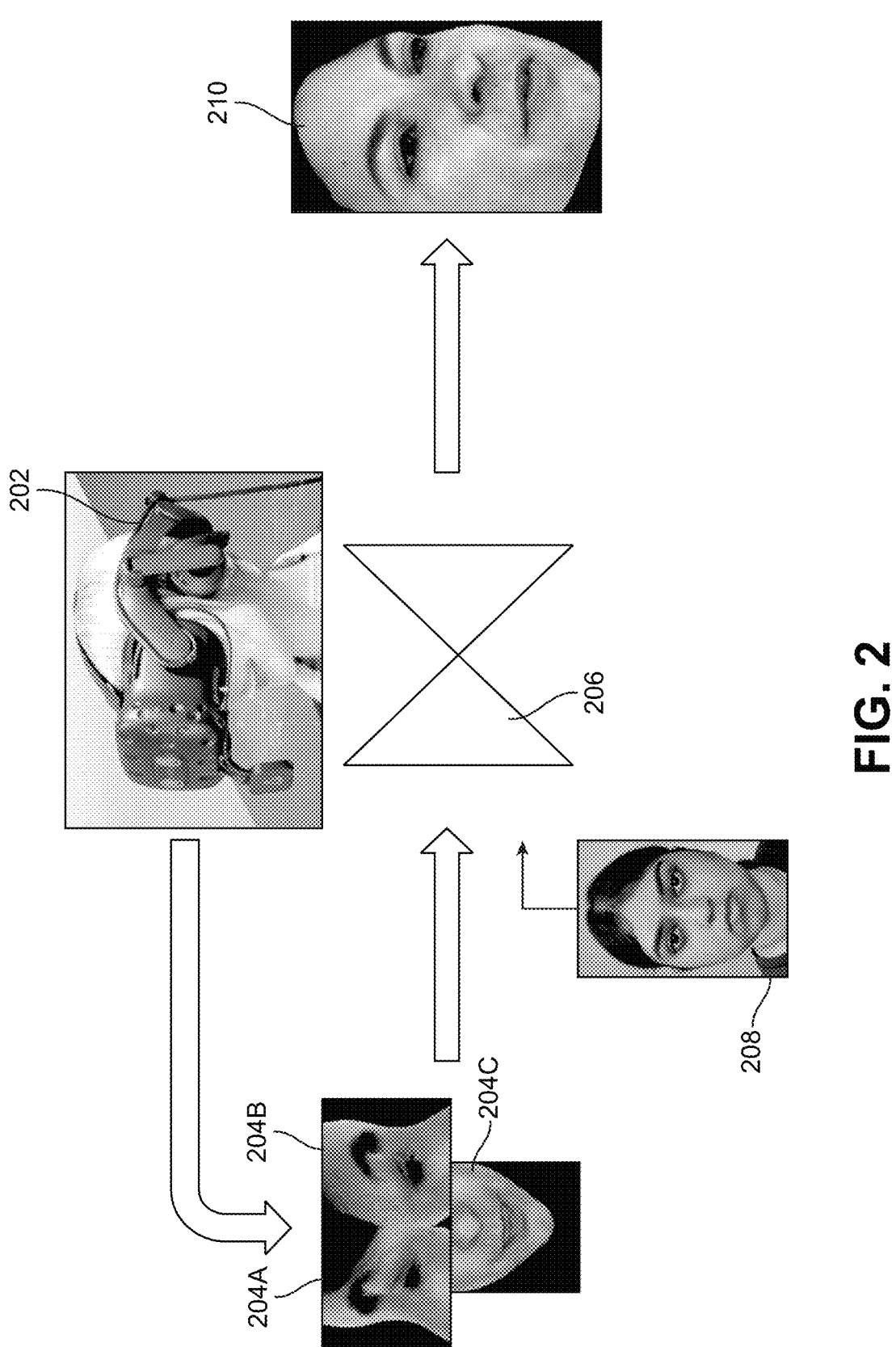
FIG. 2 illustrates an example head mounted XR system with user facing cameras for generating a 3D facial model, in accordance with some examples.

FIG. 2 illustrates an example head mounted XR system with user facing cameras for generating a 3D facial model 210. As shown in FIG. 2, the 3D model generator can utilize input frames such as oblique frames 204A, 204B, 204C, and/or 208 to generate the 3D facial model 210. As shown in FIG. 2, the 3D model fitting engine 206 can also generate and/or apply a texture to the underlying 3D model (e.g., the 3D facial model 104 of FIG. 1) to provide a digital representation of the user wearing the head mounted XR system 202. In one illustrative example, a 3D morphable model (3DMM) can be used to represent the geometry of the user's head. In some cases, a 3DMM may lack capability to accurately reproduce the inner mouth and eyeballs of the user. In some cases, the resulting 3D facial model 210 can produce unrealistic results in the eye and mouth regions.

In some implementations, a highly detailed 3D facial model (not shown) can be generated using expensive camera equipment that captures an individual's face from multiple angles. In some cases, the 3D facial model can also be manually edited by skilled artists to product an accurate depiction of an individual. The process of generating such a highly detailed 3D facial model results in only a single model for the specific individual and does not provide a flexible framework for generating 3D models for any individual without advanced preparation of the detailed 3D facial model.

Figure 3:
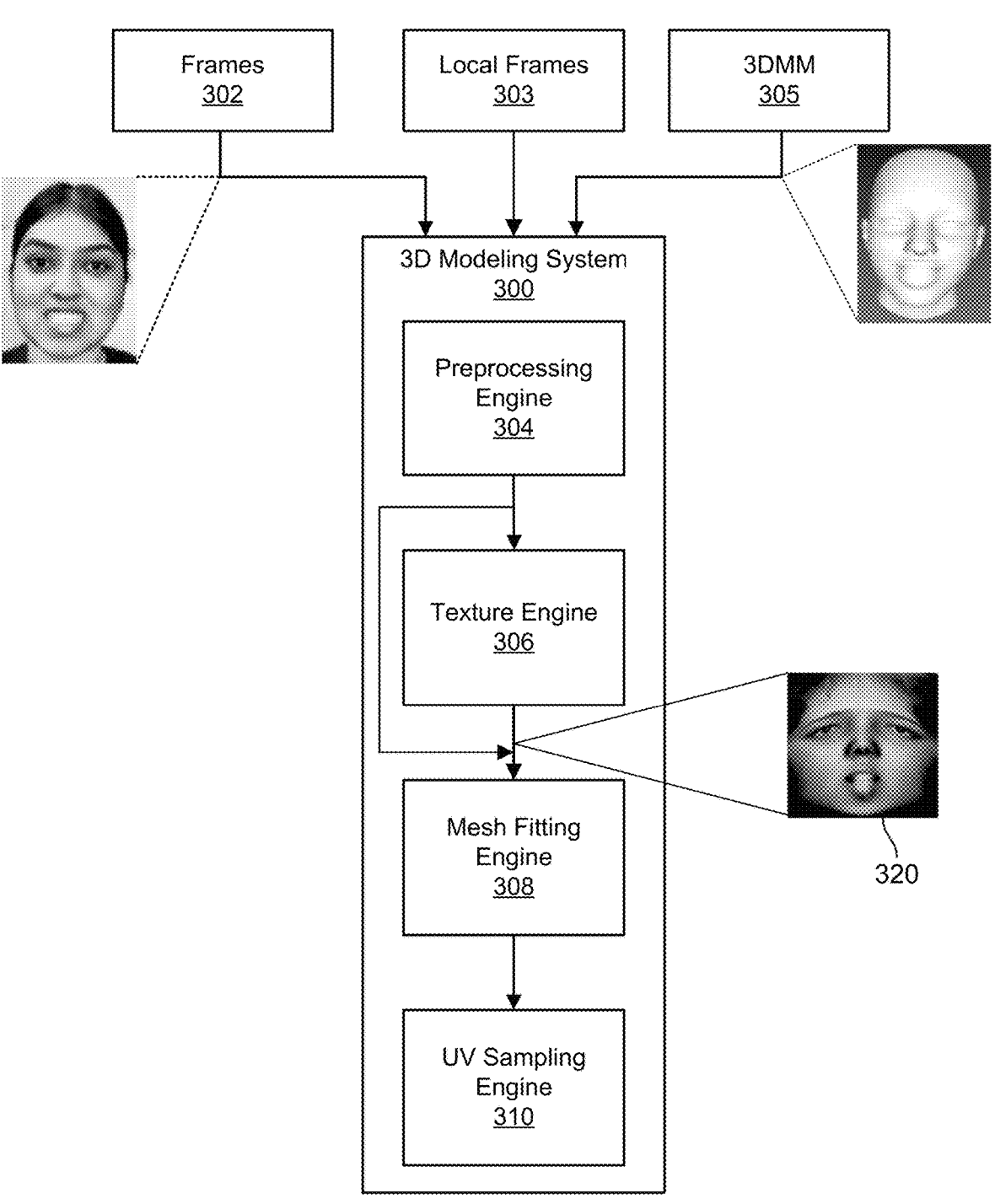
FIG. 3 is a diagram illustrating an example of a 3D modeling system, in accordance with some examples.

FIG. 3 is a block diagram illustrating an example of a 3D modeling system 300 that can generate a textured 3D model (e.g., a 3D morphable model (3DMM)) using at least one image frame 302 based on input neutral 3DMMs 305 (e.g., a 3DMM that may not have been customized for a particular expression and/or a particular user). As shown in FIG. 3, the 3D modeling system 300 includes a preprocessing engine 304, a texture engine 306, a mesh fitting engine 308, and a UV sampling engine 310. In some traditional 3D modeling systems, generating textures (such as UV textures by the texture engine 306) and mesh fitting (e.g., by the mesh fitting engine 308) may be performed independently and possibly concurrently (e.g., in parallel) to generate a mesh to represent a user, such as for an avatar. However, separating the texture generation and mesh fitting may limit a quality of such generated avatars. Instead, it may be useful to integrate the two processes so that limitations, for example, to mesh fitting, may be compensated in part by the texture generation, and/or vice versa. As an example, as shown in FIG. 3, the 3D modeling system 300 may be structured such that textures generated by the texture engine 306 may be used by the mesh fitting engine 308 for refining the mesh, allowing the two processes to be integrated so that the mesh model and texture pair together smoothly as compared to bringing together a separately determined mesh model and texture.

In FIG. 3, the preprocessing engine 304 may receive the 3DMM 305 and image frame 302 and preprocess the 3DMM to produce a face position map and/or UV attributes. The preprocessing engine 304 may also preprocess the received image frame 302 to produce crops, bounding boxes, image transformations, etc. Output of the image preprocessing engine 304 and the input frames (e.g., image frame 302 or local frames 303) may be passed into the texture engine 306 and/or mesh fitting engine 308. The texture engine 306 may generate a UV texture 320 for a face based on the output of the image preprocessing engine 304. The UV texture 320 and 3DMM 305 may be input to the mesh fitting engine 308, and the mesh fitting engine 308 may perform a 3D model fitting technique based on the UV texture 320 to adapt the neutral 3DMM 305 to generate a refined 3DMM model/mesh.

Of note, while the 3D modeling system 300 is shown to include certain components, one of ordinary skill will appreciate that the 3D modeling system 300 can include more components than those shown in FIG. 3. The components of the 3D modeling system 300 can include software, hardware, or one or more combinations of software and hardware. For example, in some implementations, the components of the 3D modeling system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the 3D modeling system 300.

In the 3D modeling system 300, the preprocessing engine 304 may receive the 3DMM 305 and perform preprocessing on the 3DMM 305. In some cases, the 3DMM 305 may be an encoded representation of a 3D model, such as a latent representation or feature vector representing the 3D model, and the 3DMM 305 may be previously generated, for example, as a part of an enrollment process capturing an image or scan of the user's face, as a neutral face. In other cases, the neutral face may be a mean face, which can represent an average face that can be transformed (e.g., by the shape basis vectors and expression basis vectors) to achieve the desired final 3D face shape of the 3D model. This neutral face may be modified by the 3D modeling system 300, for example, based on a displacement map to generate a refined mesh (e.g., refined 3DMM). The 3DMM 305 may be input to the preprocessing engine 304. In one illustrative example, the 3DMM 305 may include a position map defining a position of each point of the 3D model and normal information defining a normal of each point on the position map. The preprocessing engine 304 can extend or convert the normal information and the position map into a coordinate UV space (which may be referred to as a UV face position map).

In some cases, the UV face position map can provide and/or represent a 2D map of the face (e.g., of a user captured in an image frame 302). For instance, the UV face position map can be a 2D image that records and/or maps the 3D positions of points (e.g., pixels) in UV space (e.g., 2D texture coordinate system). The U in the UV space and the V in the UV space can denote the axes of the UV face position map (e.g., the axes of a 2D texture of the face). In one illustrative example, the U in the UV space can denote a first axis (e.g., a horizontal X-axis) of the UV face position map and the V in the UV space can denote a second axis (e.g., a vertical Y-axis) of the UV face position map. In some examples, the UV position map can record, model, identify, represent, and/or calculate a 3D shape, structure, contour, depth and/or other details of the face (and/or a face region of the head) as UV attributes. In some implementations, a machine learning model (e.g., a neural network) can be used to generate the UV face position map. The UV face position map can thus encode the expression of the face (and in some cases the pose of the head), providing information that can be used by the texture engine 306 and mesh fitting engine 308 to animate a facial representation. The preprocessing engine 304 may output the UV face position map and/or UV attributes to the texture engine 306 and the mesh fitting engine 308.

The 3D modeling system 300 also obtains local frames (e.g., frames from a user facing camera of the head mounted XR system 202 of FIG. 2). The image frame engine 304 can obtain or receive an image frame 302 and/or local frames 303 captured by an image sensor, from storage, from memory, from an external source (e.g., a server, an external memory accessed via a network, or other external source), or the like. In some cases, the image frame can be included in a sequence of frames (e.g., a video, a sequence of standalone or still images, etc.). In one illustrative example, each frame of the sequence of frames can include a grayscale component per pixel. Other examples of frames include frames having red (R), green (G), and blue (B) components per pixel (referred to as an RGB video including RGB frames), luma, chroma-blue, chroma-red (YUV, YCbCr, or Y'CbCr) components per pixel and/or any other suitable type of image. The sequence of frames can be captured by one or more cameras, obtained from storage, received from another device (e.g., a camera or device including a camera), or obtained from another source. In some implementations, the image frame engine 304 can convert the image frame 302 to grayscale. The image frame engine 304 can, in some cases, crop a portion of the image frame 302 that corresponds to a face. In some examples, the image frame engine 304 can perform a face detection process and/or face recognition process to detect and/recognize a face within the image frame 302. The image frame engine 304 can generate or apply a bounding box (e.g., bounding box 130 shown in FIG. 1) around the face and can crop out the image data within the bounding box to generate an input image for the 3D model fitting engine 306. The preprocessing engine 304 may output the preprocessed image frame to the texture engine 306.

The texture engine 306 may receive the UV attribute map along with preprocessed frame. In some implementations, the texture engine 308, can be implemented as a machine learning model (e.g., a deep learning neural network). In some examples, the machine learning model can be trained to generate UV textures for the face using images of the face along with the UV attribute map. In some cases, the texture engine 306 may generate a full face UV texture using local feature information for generating accurate depictions of specific portions of a face (e.g., mouth, eyes) and combine the local feature information with features of a full facial model to produce a more accurate depiction of the user.

Figure 4:
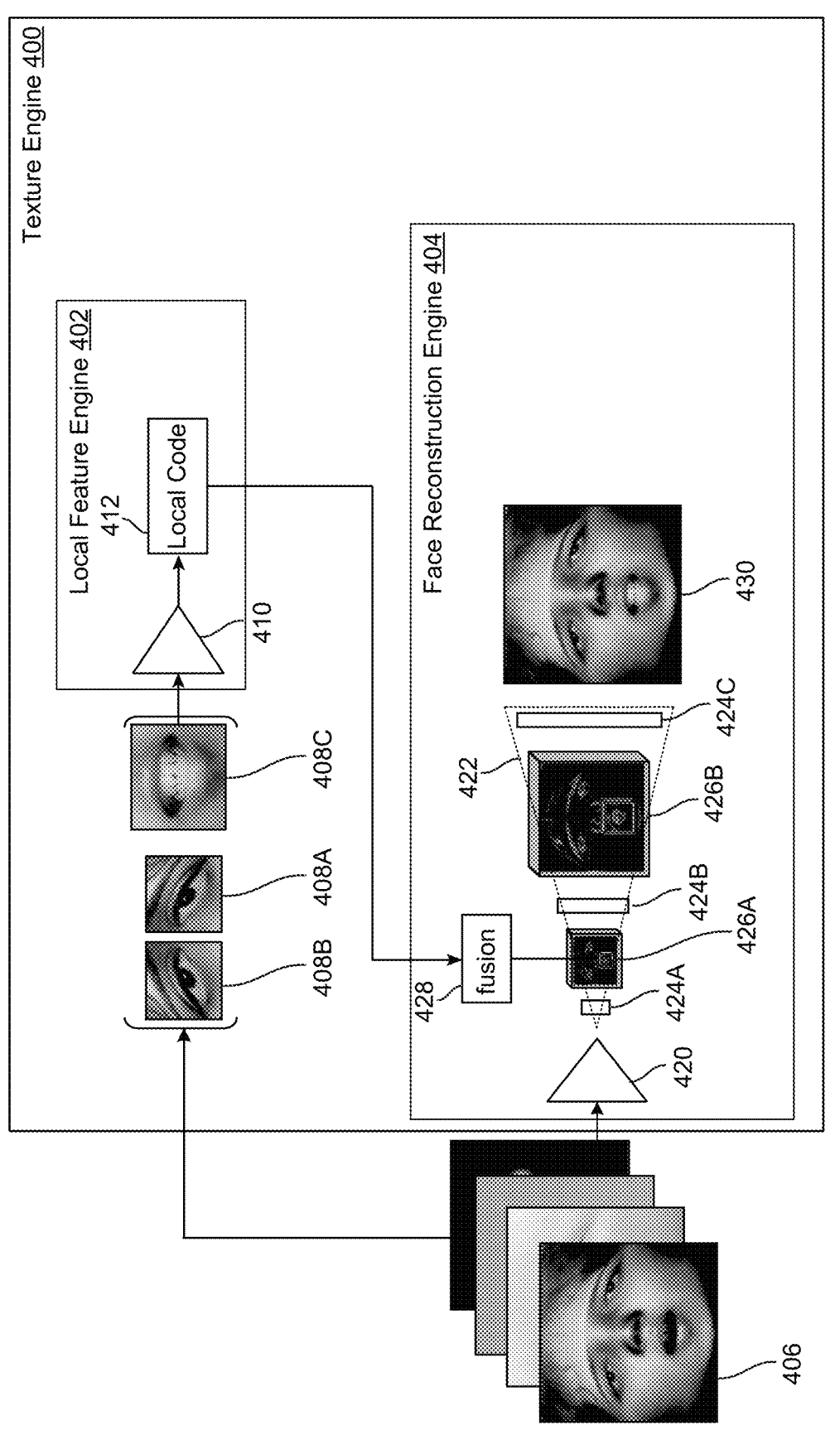
FIG. 4 illustrates an example configuration for a texture engine that can combine local features with a full face UV texture, in accordance with aspects of the present disclosure.

FIG. 4 illustrates an example configuration for a texture engine 400 that can combine local features with a full face UV texture, in accordance with aspects of the present disclosure. The texture engine 400 may correspond with texture engine 306 of FIG. 3. As shown, the texture engine 400 may include a local feature engine 402 and a face reconstruction engine 404. The preprocessed image frame(s), UV face position map and/or UV attributes 406 from the preprocessing engine (e.g., preprocessing engine 304 of FIG. 3) may be passed into the local feature engine 402 and the face reconstruction engine 404.

As discussed above, the preprocessing engine may pass cropped oblique input frames 408A, 408B, 408C (collectively, oblique input frames 408) corresponding to the left eye, right eye, and mouth respectively and these oblique input frames 408 may be input to an encoder 410 of the local feature engine 402. The encoder 410 may be trained to produce latent code describing non-oblique cropped UV textures for local facial features such as the mouth and eyes from the oblique input frames 408 for output as a local code 412.

In some cases, the face reconstruction engine 404 can receive the preprocessed image frame(s), UV face position map and/or UV attributes 406 and generate a full face UV feature tensor (not shown). The full face UV feature tensor may be input to an encoder 420. The encoder 420 may encode features of the full face UV feature tensor and pass the encoded features to a decoder 422. The decoder 422 may include multiple layers 424A, 424B, and 424C and these layers may generate a structured feature, such as global intermediate feature 426A, 426B at multiple resolutions with a set of channels. The set of channels may correspond to input channels, such as a red channel, green channel, blue channel, specular channel, difference between a normal face channel, expression change map channel, etc. The face reconstruction engine 404 can include a fusion engine 428 that can combine the local code 412 generated by the local feature engine 402 with the full face features (e.g., global intermediate features 426A in this example) to generate a combined UV texture 430 (e.g., UV texture 320 of FIG. 3) that includes additional detail provided by the local feature engine 402. The combined UV texture 430 may be output to the mesh fitting engine, such as mesh fitting engine 308 of FIG. 3.

Returning to FIG. 3, in some cases, the mesh fitting engine 308 may receive the UV texture 320 (e.g., combined UV texture 430) from the texture engine 306 as input along with the UV face position map and/or UV attributes from the preprocessing engine. The mesh fitting engine 308 may use the UV texture 320 and UV face position map and/or UV attributes to generate a UV displacement map. In some cases, displacement mapping may be a technique to determine geometric location of points relative to a textured surface and a resulting UV displacement map may indicate how to distort a surface (e.g., a mesh model) to better reflect the details in the texture. In some cases, the mesh fitting engine 308 may generate the UV displacement map based on the UV texture 320, UV face position map and/or UV attributes, and the mesh fitting engine 308 may be trained based on a vertex loss for the vertex points of the mesh with a gradient propagated to the UV-displacement map. The UV displacement map may then be input to the UV sampling engine 310.

In some cases, the UV sampling engine 310 may receive the UV displacement map along with the 3DMM 305. The UV sampling engine may sample vertices of the 3DMM 305 based on the UV displacement map to deform the rough mesh to generate a finetuned mesh (3DMM). For example, the UV sampling engine 310 may map points of the UV displacement map to corresponding vertices of the 3DMM 305 and displace the corresponding vertex based on corresponding values in the displacement map. In some cases, the UV texture 320 may then be applied as a texture to the finetuned mesh (3DMM) to generate a textured 3D model. In some examples, the textured 3D model can be used to render a 3D digital representation of the input image.

Figure 5:
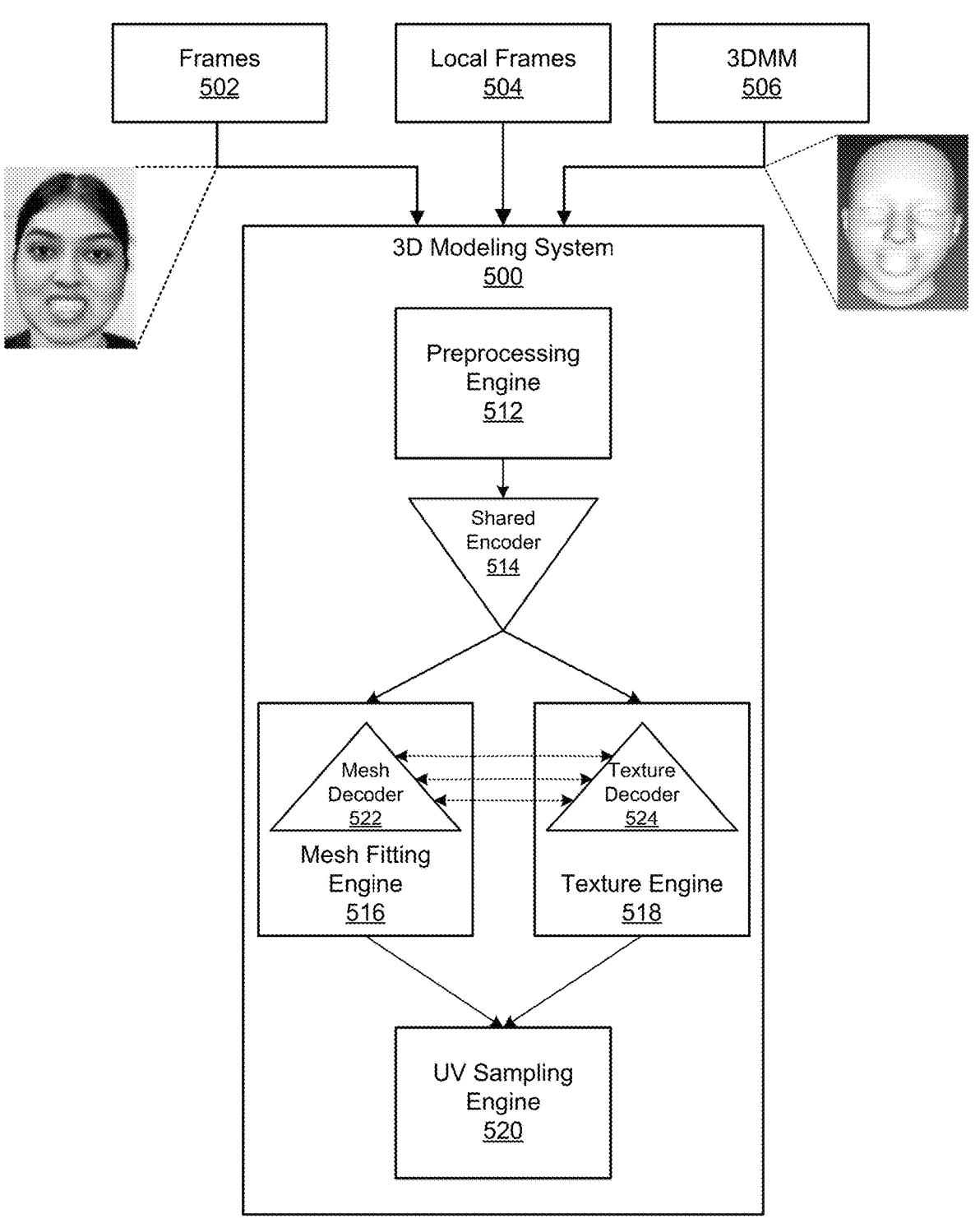
FIG. 5 illustrates a technique for private data sharing for XR systems, in accordance with aspects of the present disclosure.

FIG. 5 is a block diagram illustrating an example of a 3D modeling system 500 for generating a textured 3D model, in accordance with aspects of the present disclosure. In some cases, 3D modeling system 500 of FIG. 5 is a variant of 3D modeling system 300 of FIG. 3. In FIG. 5, the 3D modeling system 500 includes a preprocessing engine 512, a shared encoder 514, a mesh fitting engine 516, a texture engine 518, and a UV sampling engine 520. In a manner similar to 3D modeling system 300 of FIG. 3, the 3D modeling system 500 of FIG. 5 may receive image frames 502, local frames 504 and a 3DMM 506, which may be preprocessed in the preprocessing engine 512 in a manner substantially similar to preprocessing engine 304 of FIG. 3. The preprocessing engine 512 may output preprocessed image frame(s), UV face position map, and/or UV attributes to a shared encoder 514. The shared encoder 514 may encode information about the preprocessed image frame(s), UV face position map, and/or UV attributes into a set of features and output this set of features to the mesh fitting engine 516 and texture engine 518.

In some cases, the mesh fitting engine 516 may include a mesh decoder 522 that may receive the set of features from the shared encoder 514. Similarly, the texture engine 518 may include a texture decoder 524 that may receive the set of features from the shared encoder 514. In some cases, the texture decoder 524 may include a set of machine learning layers trained to generate a UV texture. The machine learning layers of the texture decoder 524 may output intermediate information, such as global intermediate feature 426A, 426B of FIG. 4, to the machine learning layers of the mesh decoder 522. In some cases, the machine learning layers of the mesh decoder 522 may also output intermediate information that may be input to machine learning layers of the texture decoder 524. In some cases, the mesh decoder 522 may include a set of machine learning layers trained to generate a UV displacement map based on the set of features and intermediate information from the texture decoder 524. Similarly, the machine learning layers of the texture decoder 524 may also be trained to generate UV textures based on the intermediate information from the mesh decoder 522. In some cases, the mesh decoder 522 may concatenate/fuse/append/etc. intermediate information from the texture decoder 524 to intermediate information from the machine learning layers of the mesh decoder 522 and the texture decoder 524 may concatenate/fuse/append/etc. intermediate information from the mesh decoder 522 to intermediate information from the machine learning layers of the texture decoder 524 to allow information to be exchanged between the two decoders. In some cases, attention layers may also be used to fuse the intermediate information from the mesh decoder 522 and texture decoder 524. By exchanging intermediate features, the two decoders may compensate for potential misaligned texture information or mesh information to allow for a better alignment when overlaying the finetuned mesh with the UV texture. In some cases, the shared encoder 514 may be trained end-to-end with the mesh decoder 522 and texture decoder 524 so that the shared encoder 514 is extracting expression information form the images and UV attributes in a manner that can be understood by the decoders. In some cases, the shared encoder 514 may be trained to extract expression information for use by the decoders.

In some cases, the UV displacement map generated by the mesh fitting engine 516 and UV texture generated by the texture engine 518 may be input to the UV sampling engine 520. In some cases, the UV sampling engine 520 may operate in a substantially similar manner to UV sampling engine 310 of FIG. 3 to generate and output a finetuned mesh that the UV texture may be applied to render a 3D digital representation of the input image.

Figure 6:
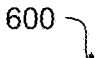
FIG. 6 illustrates a flowchart of a process for generating a texture for a 3D facial model, in accordance with some examples.

FIG. 6 illustrates a flowchart of a process 600 for generating a texture for a 3D facial model. The process 600 may be performed by a computing device (or apparatus) or a component (e.g., 3D modeling system 300 of FIG. 3, 3D modeling system 500 of FIG. 5, processor 910 of FIG. 9, etc.) of the computing device. Examples of the computing device can include the head mounted XR system 202 of FIG. 2, computing system 900 of FIG. 9. The computing device may be a mobile device (e.g., a mobile phone), an extended reality (XR) device such as a virtual reality (VR) device or augmented reality (AR) device, a vehicle or component or system of a vehicle, a network-connected wearable such as a watch, or other type of computing device. In another example, the process 600 may be performed by a computing device with the computing system 900 shown in FIG. 9. The operations of the process 600 may be implemented as software components that are executed and run on one or more processors.

At block 902, the computing device (or component thereof) may obtain a frame (e.g., image 102 of FIG. 1, frames 204 and frame 208 of FIG. 2, frames 302, local frames 303 of FIG. 3, frames 408 of FIG. 4, frames 502, local frames 504 of FIG. 5, etc.) the frame including a face.

At block 904, the computing device (or component thereof) may obtain a mesh 3D model of the face (e.g., the 3D facial model 104 of FIG. 1, 3D facial model 210 of FIG. 2, 3DMM 305 of FIG. 3, 3DMM 506 of FIG. 5, etc.). In some cases, the computing device (or component thereof) may generate UV attributes based on the mesh 3D model (e.g., by preprocessing engine 304 of FIG. 3, preprocessing engine 512 of FIG. 5, etc.), wherein the facial texture information is generated based on the UV attributes. In some examples, the displacement map information is generated further based on the UV attributes. In some cases, the UV attributes are generated by a first machine learning model.

At block 906, the computing device (or component thereof) may generate facial texture information (e.g., UV texture 320 of FIG. 3, combined UV texture 430 of FIG. 4, etc.) associated with the face based on the frame and the mesh 3D model. In some cases, the facial texture information comprises a UV facial texture. In some examples, the facial texture information is generated by a second machine learning model, and wherein the displacement map information is generated by a third machine learning model. In some cases, the facial texture information comprises intermediate information from a first layer of the second machine learning model (e.g., for texture engine 518 of FIG. 5). In some cases, the facial texture information is generated based in part on the displacement map information, and wherein the displacement map information comprises intermediate information from a second layer of the third machine learning model.

At block 908, the computing device (or component thereof) may generate, based on the facial texture information, displacement map information (e.g., by mesh fitting engine 308 of FIG. 3, mesh fitting engine 516 of FIG. 5, etc.).

At block 910, the computing device (or component thereof) may apply the displacement map information to the mesh 3D model to generate a finetuned mesh 3D model (e.g., by UV sampling engine 310 of FIG. 3, UV sampling engine 520 of FIG. 5, etc.). In some cases, the computing device (or component thereof) may apply the facial texture information to the finetuned 3D mesh model to generate a textured 3D model. In some examples, applying the displacement map information to the mesh 3D model includes: mapping vertices of the mesh 3D model to a displacement map including the displacement map information; and displacing the mapped vertices based on values of the displacement map.

In other examples, a device may include an application or function to perform some of the processes described herein (e.g., process 600 and/or any other process described herein). In some examples, the processes described herein (e.g., process 600 and/or any other process described herein) may be performed by a computing device or apparatus. In some examples, the process 600 can be performed by the 3D modeling system 300 of FIG. 3 and/or 3D modeling system 500 of FIG. 5 described above. In another example, process 600 can be performed by a computing device or system with the architecture of the computing system 900 shown in FIG. 9.

The computing device can include any suitable device, such as a mobile device (e.g., a mobile phone), a desktop computing device, a tablet computing device, an extended reality (XR) device or system (e.g., a VR headset, an AR headset, AR glasses, or other XR device or system), a wearable device (e.g., a network-connected watch or smartwatch, or other wearable device), a server computer or system, a vehicle or computing device of a vehicle (e.g., an autonomous vehicle), a robotic device, a television, and/or any other computing device with the resource capabilities to perform the processes described herein, including the process 600. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
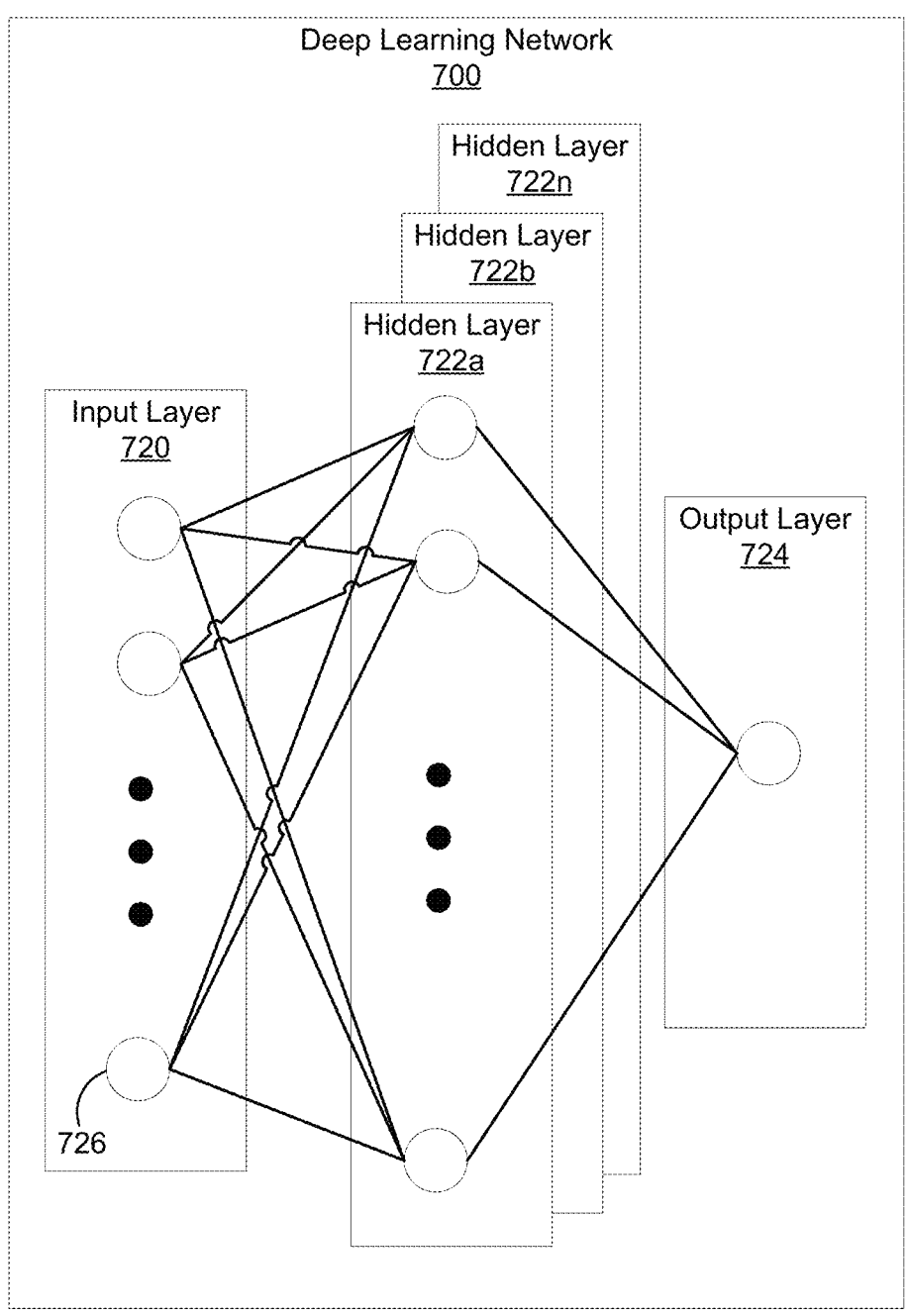
FIG. 7 is a block diagram illustrating an example of a deep learning network, in accordance with some examples.

FIG. 7 is an illustrative example of a deep learning neural network 700 that can be used by a 3D model training system. An input layer 720 includes input data. In one illustrative example, the input layer 720 can include data representing the pixels of an input video frame. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 724 that provides an output resulting from the processing performed by the hidden layers 722a, 722b, through 722n. In one illustrative example, the output layer 724 can provide a classification for an object in an input video frame. The classification can include a class identifying the type of object (e.g., a person, a dog, a cat, or other object).

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the hidden layers 722a, 722b, through 722n can transform the information of each input node by applying activation functions to the information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 724, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 724. In an example in which the neural network 700 is used to identify objects in images, the neural network 700 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 700 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of identifying objects in images, the forward pass can include passing a training image through the neural network 700. The weights are initially randomized before the neural network 700 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 700 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted $$w = w_i - \eta \frac{dL}{dW},$$

where w denotes a weight, wi denotes the initial weight, and η denotes a learning rate. The learning rate can be set to any suitable value, with a high learning rate including larger weight updates and a lower value indicating smaller weight updates.

The neural network 700 can include any suitable deep network. One example includes a convolutional neural network (CNN), which includes an input layer and an output layer, with multiple hidden layers between the input and out layers. An example of a CNN is described below with respect to FIG. 8. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

Figure 8:
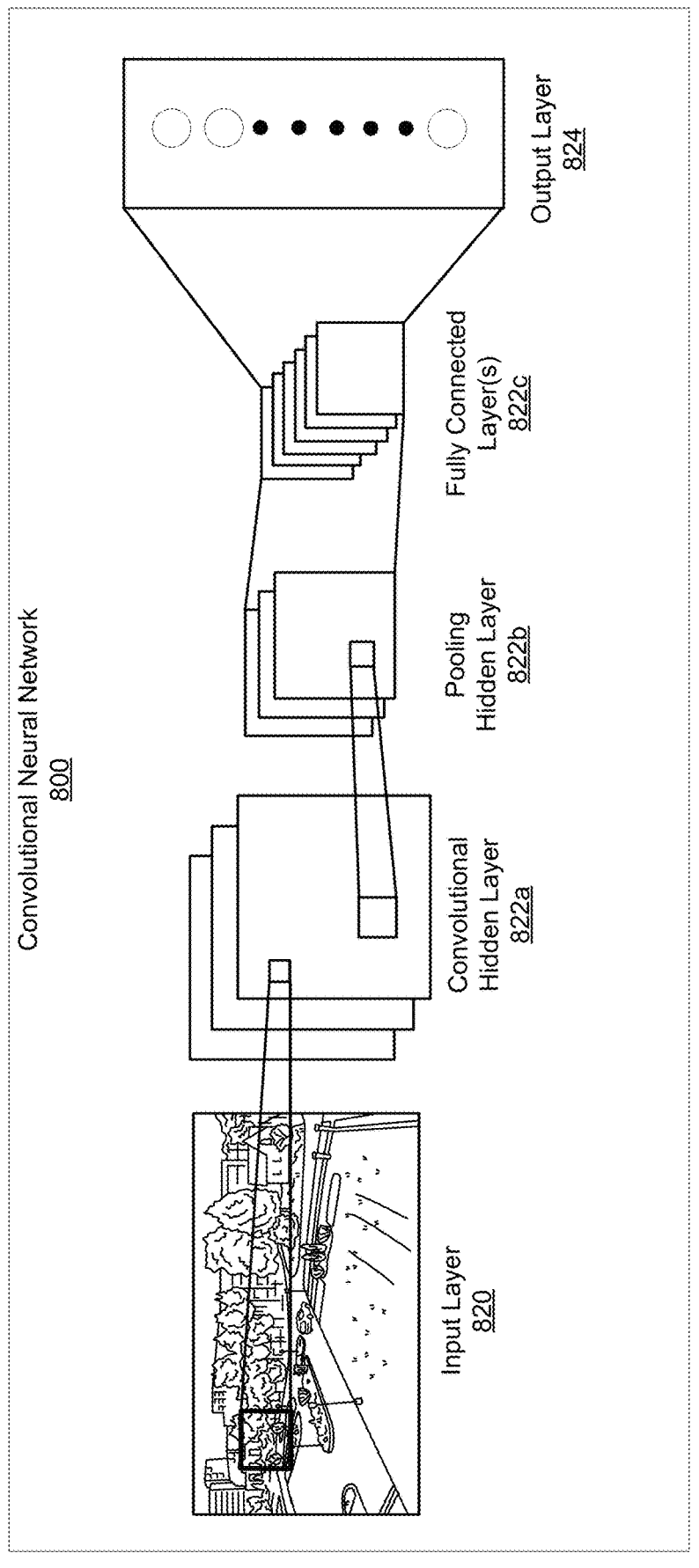
FIG. 8 is a block diagram illustrating an example of a convolutional neural network, in accordance with some examples.

FIG. 8 is an illustrative example of a convolutional neural network 800 (CNN 800). The input layer 820 of the CNN 800 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822b can take each activation map output from the convolutional hidden layer 822a and generates a condensed activation map (or feature map) using a pooling function. Max-pooling is one example of a function performed by a pooling hidden layer. Other forms of pooling functions be used by the pooling hidden layer 822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 822a. In the example shown in FIG. 8, three pooling filters are used for the three activation maps in the convolutional hidden layer 822a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822a having a dimension of 24×24 nodes, the output from the pooling hidden layer 822b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 822b to every one of the output nodes in the output layer 824. Using the example above, the input layer includes 28×28 nodes encoding the pixel intensities of the input image, the convolutional hidden layer 822a includes 3×24×24 hidden feature nodes based on application of a 5×5 local receptive field (for the filters) to three activation maps, and the pooling layer 822b includes a layer of 3×12×12 hidden feature nodes based on application of max-pooling filter to 2×2 regions across each of the three feature maps. Extending this example, the output layer 824 can include ten output nodes. In such an example, every node of the 3×12× 12 pooling hidden layer 822b is connected to every node of the output layer 824.

The fully connected layer 822c can obtain the output of the previous pooling layer 822b (which should represent the activation maps of high-level features) and determines the features that most correlate to a particular class. For example, the fully connected layer 822c layer can determine the high-level features that most strongly correlate to a particular class, and can include weights (nodes) for the high-level features. A product can be computed between the weights of the fully connected layer 822c and the pooling hidden layer 822b to obtain probabilities for the different classes. For example, if the CNN 800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 9:
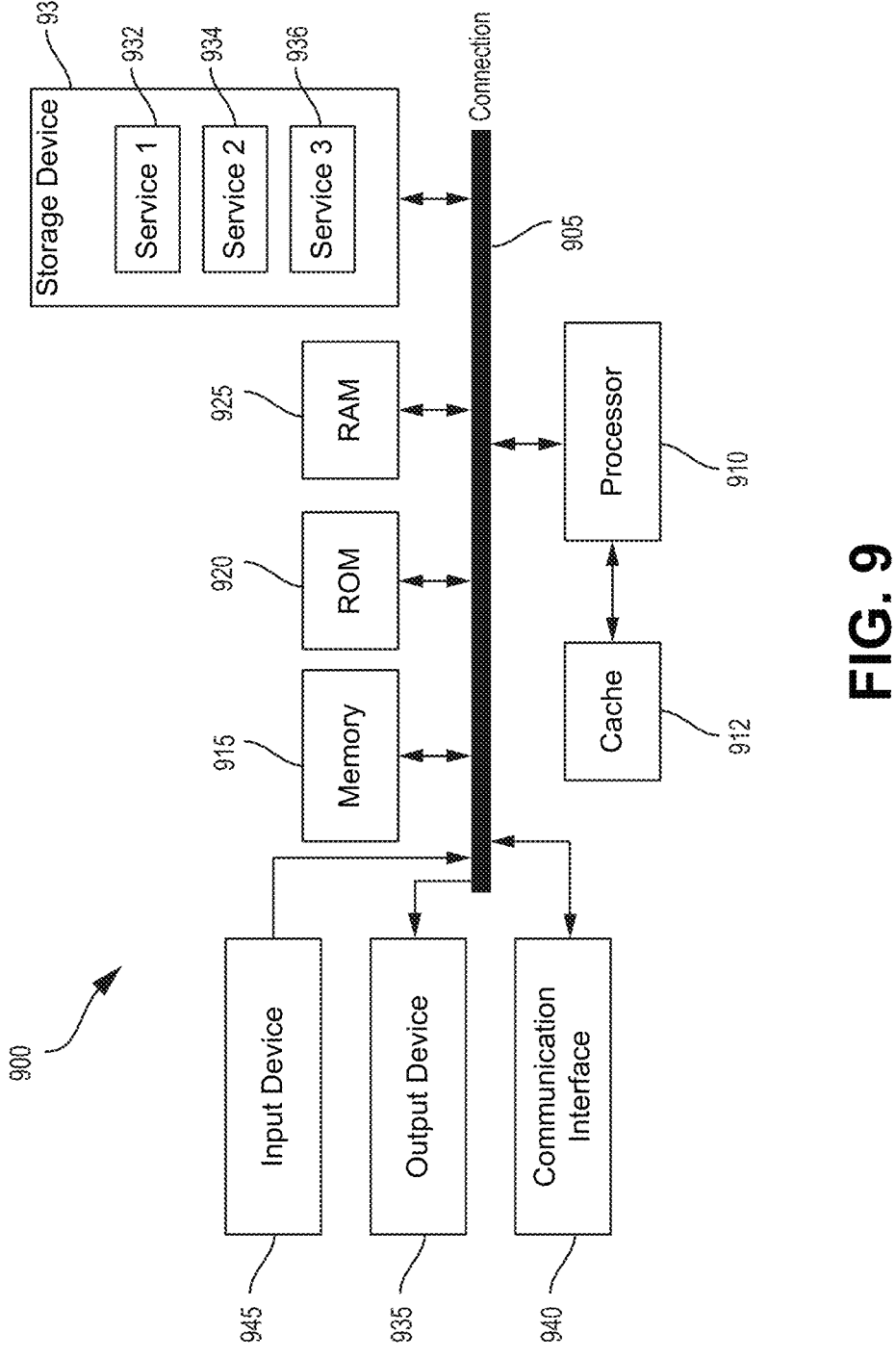
FIG. 9 is a diagram illustrating an example of a system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for generating a three-dimensional facial model, the method comprising: obtaining a frame, the frame including a face; obtaining a mesh 3D model of the face; generating facial texture information associated with the face based on the frame and the mesh 3D model; generating, based on the facial texture information, displacement map information; and applying the displacement map information to the mesh 3D model to generate a finetuned mesh 3D model.

Aspect 2. The method of Aspect 1, further comprising generating UV attributes based on the mesh 3D model, wherein the facial texture information is generated based on the UV attributes.

Aspect 3. The method of Aspect 2, wherein the displacement map information is generated further based on the UV attributes.

Aspect 4. The method of any of Aspects 2-3, wherein the UV attributes are generated by a first machine learning model.

Aspect 5. The method of any of Aspects 1-4, wherein the facial texture information comprises a UV facial texture.

Aspect 6. The method of any of Aspects 1-5, wherein the facial texture information is generated by a second machine learning model, and wherein the displacement map information is generated by a third machine learning model.

Aspect 7. The method of Aspect 6, wherein the facial texture information comprises intermediate information from a first layer of the second machine learning model.

Aspect 8. The method of Aspect 7, wherein the facial texture information is generated based in part on the displacement map information, and wherein the displacement map information comprises intermediate information from a second layer of the third machine learning model.

Aspect 9. The method of any of Aspects 1-8, further comprising applying the facial texture information to the finetuned 3D mesh model to generate a textured 3D model.

Aspect 10. The method of any of Aspects 1-8, wherein applying the displacement map information to the mesh 3D model comprises: mapping vertices of the mesh 3D model to a displacement map including the displacement map information; and displacing the mapped vertices based on values of the displacement map.

Aspect 11. An apparatus for generating a three-dimensional facial model, the apparatus comprising: at least one memory; and at least one processor coupled to the at least one memory, the at least one processor being configured to: obtain a frame, the frame including a face; obtain a mesh 3D model of the face; generate facial texture information associated with the face based on the frame and the mesh 3D model; generate, based on the facial texture information, displacement map information; and apply the displacement map information to the mesh 3D model to generate a finetuned mesh 3D model.

Aspect 12. The apparatus of Aspect 11, wherein the at least one processor is further configured to generate UV attributes based on the mesh 3D model, wherein the facial texture information is generated based on the UV attributes.

Aspect 13. The apparatus of Aspect 12, wherein the displacement map information is generated further based on the UV attributes.

Aspect 14. The apparatus of any of Aspects 12-13, wherein the UV attributes are generated by a first machine learning model.

Aspect 15. The apparatus of any of Aspects 11-14, wherein the facial texture information comprises a UV facial texture.

Aspect 16. The apparatus of any of Aspects 11-15, wherein the facial texture information is generated by a second machine learning model, and wherein the displacement map information is generated by a third machine learning model.

Aspect 17. The apparatus of Aspect 16, wherein the facial texture information comprises intermediate information from a first layer of the second machine learning model.

Aspect 18. The apparatus of Aspect 17, wherein the facial texture information is generated based in part on the displacement map information, and wherein the displacement map information comprises intermediate information from a second layer of the third machine learning model.

Aspect 19. The apparatus of any of Aspects 11-18, the at least one processor is further configured to apply the facial texture information to the finetuned 3D mesh model to generate a textured 3D model.

Aspect 20. The apparatus of any of Aspects 11-19, wherein, to apply the displacement map information to the mesh 3D model, the at least one processor is further configured to: map vertices of the mesh 3D model to a displacement map including the displacement map information; and displace the mapped vertices based on values of the displacement map.

Aspect 21. A non-transitory computer-readable medium having stored thereon instructions that, when executed by at least one processor, cause the at least one processor to: obtain a frame, the frame including a face; obtain a mesh 3D model of the face; generate facial texture information associated with the face based on the frame and the mesh 3D model; generate, based on the facial texture information, displacement map information; and apply the displacement map information to the mesh 3D model to generate a finetuned mesh 3D model.

Aspect 22. The non-transitory computer-readable medium of Aspect 21, wherein the instructions cause the at least one processor to generate UV attributes based on the mesh 3D model, wherein the facial texture information is generated based on the UV attributes.

Aspect 23. The non-transitory computer-readable medium of Aspect 22, wherein the displacement map information is generated further based on the UV attributes.

Aspect 24. The non-transitory computer-readable medium of any of Aspects 22-23, wherein the UV attributes are generated by a first machine learning model.

Aspect 25. The non-transitory computer-readable medium of any of Aspects 21-24, wherein the facial texture information comprises a UV facial texture.

Aspect 26. The non-transitory computer-readable medium of any of Aspects 21-25, wherein the facial texture information is generated by a second machine learning model, and wherein the displacement map information is generated by a third machine learning model.

Aspect 27. The non-transitory computer-readable medium of Aspect 26, wherein the facial texture information comprises intermediate information from a first layer of the second machine learning model.

Aspect 28. The non-transitory computer-readable medium of Aspect 27, wherein the facial texture information is generated based in part on the displacement map information, Polsinelli Ref. No. 094922-765286 and wherein the displacement map information comprises intermediate information from a second layer of the third machine learning model.

Aspect 29. The non-transitory computer-readable medium of any of Aspects 21-28, wherein the instructions cause the at least one processor to apply the facial texture information to the finetuned 3D mesh model to generate a textured 3D model.

Aspect 30. The non-transitory computer-readable medium of any of Aspects 21-29, wherein, to apply the displacement map information to the mesh 3D model, the instructions cause the at least one processor to: map vertices of the mesh 3D model to a displacement map including the displacement map information; and displace the mapped vertices based on values of the displacement map.

Aspect 31: An apparatus comprising one or more means for performing any of the operations of aspects 1 to 10.

What is claimed is:

1. A method for generating a three-dimensional facial model, the method comprising:
  obtaining a mesh 3D model of a face;
  generating facial texture information associated with a face based on a set of oblique frames and the mesh 3D model, wherein each frame of the set of oblique frames capture a specific portion of the face, wherein each specific portion comprises less than all portions of the face associated with variations in appearance, and wherein the set of oblique frames comprises captured frames of the face;
  generating, based on the facial texture information generated based on the set of oblique frames, displacement map information; and
  applying the displacement map information to the mesh 3D model to generate a finetuned mesh 3D model of the face.

2. The method of claim 1, further comprising generating UV attributes based on the mesh 3D model, wherein the facial texture information is generated based on the UV attributes.

3. The method of claim 2, wherein the displacement map information is generated further based on the UV attributes.

4. The method of claim 2, wherein the UV attributes are generated by a first machine learning model.

5. The method of claim 1, wherein the facial texture information comprises a UV facial texture.

6. The method of claim 1, wherein the facial texture information is generated by a second machine learning model, and wherein the displacement map information is generated by a third machine learning model.

7. The method of claim 6, wherein the facial texture information comprises first intermediate information from a first layer of the second machine learning model.

8. The method of claim 6, wherein the facial texture information is generated based in part on second intermediate information from a layer of the third machine learning model, and wherein the displacement map information is generated based on third intermediate information from a layer of the third machine learning model.

9. The method of claim 1, further comprising applying the facial texture information to the finetuned 3D mesh model to generate a textured 3D model.

10. The method of claim 1, wherein applying the displacement map information to the mesh 3D model comprises:
  mapping vertices of the mesh 3D model to a displacement map including the displacement map information; and
  displacing the mapped vertices based on values of the displacement map.

11. An apparatus for generating a three-dimensional facial model, the apparatus comprising:
  at least one memory; and
  at least one processor coupled to the at least one memory, the at least one processor being configured to:
    obtain a mesh 3D model of a face;
    generate facial texture information associated with a face based on a set of oblique frames and the mesh 3D model, wherein each frame of the set of oblique frames capture a specific portion of the face, and wherein each specific portion comprises less than all portions of the face associated with variations in appearance, and wherein the set of oblique frames comprises captured frames of the face;
    generate, based on the facial texture information generated based on the set of oblique frames, displacement map information; and
    apply the displacement map information to the mesh 3D model to generate a finetuned mesh 3D model of the face.

12. The apparatus of claim 11, wherein the at least one processor is further configured to generate UV attributes based on the mesh 3D model, wherein the facial texture information is generated based on the UV attributes.

13. The apparatus of claim 12, wherein the displacement map information is generated further based on the UV attributes.

14. The apparatus of claim 12, wherein the UV attributes are generated by a first machine learning model.

15. The apparatus of claim 11, wherein the facial texture information comprises a UV facial texture.

16. The apparatus of claim 11, wherein the facial texture information is generated by a second machine learning model, and wherein the displacement map information is generated by a third machine learning model.

17. The apparatus of claim 16, wherein the facial texture information comprises first intermediate information from a first layer of the second machine learning model.

18. The apparatus of claim 16, wherein the facial texture information is generated based in part second intermediate information from a layer of the third machine learning model, and wherein the displacement map information is generated based on third intermediate information from a layer of the third machine learning model.

19. The apparatus of claim 11, the at least one processor is further configured to apply the facial texture information to the finetuned 3D mesh model to generate a textured 3D model.

20. The apparatus of claim 11, wherein, to apply the displacement map information to the mesh 3D model, the at least one processor is further configured to:

map vertices of the mesh 3D model to a displacement map including the displacement map information; and displace the mapped vertices based on values of the displacement map.

21. A non-transitory computer-readable medium having stored thereon instructions that, when executed by at least one processor, cause the at least one processor to:

obtain a mesh 3D model of a face;

generate facial texture information associated with a face based on a set of oblique frames and the mesh 3D model, wherein each frame of the set of oblique frames capture a specific portion of the face, and wherein each specific portion comprises less than all portions of the face associated with variations in appearance, and wherein the set of oblique frames comprises captured frames of the face;

generate, based on the facial texture information generated based on the set of oblique frames, displacement map information; and apply the displacement map information to the mesh 3D model to generate a finetuned mesh 3D model of the face.

22. The non-transitory computer-readable medium of claim 21, wherein the instructions cause the at least one processor to generate UV attributes based on the mesh 3D model, wherein the facial texture information is generated based on the UV attributes.

23. The non-transitory computer-readable medium of claim 22, wherein the displacement map information is generated further based on the UV attributes.

24. The non-transitory computer-readable medium of claim 22, wherein the UV attributes are generated by a first machine learning model.

25. The non-transitory computer-readable medium of claim 21, wherein the facial texture information comprises a UV facial texture.

26. The non-transitory computer-readable medium of claim 21, wherein the facial texture information is generated by a second machine learning model, and wherein the displacement map information is generated by a third machine learning model.

27. The non-transitory computer-readable medium of claim 26, wherein the facial texture information comprises first intermediate information from a first layer of the second machine learning model.

28. The non-transitory computer-readable medium of claim 26, wherein the facial texture information is generated based in part on second intermediate information from a layer of the third machine learning model, and wherein the displacement map information is generated based on third intermediate information from a layer of the third machine learning model.

29. The non-transitory computer-readable medium of claim 21, wherein the instructions cause the at least one processor to apply the facial texture information to the finetuned 3D mesh model to generate a textured 3D model.

30. The non-transitory computer-readable medium of claim 21, wherein, to apply the displacement map information to the mesh 3D model, the instructions cause the at least one processor to:

map vertices of the mesh 3D model to a displacement map including the displacement map information; and displace the mapped vertices based on values of the displacement map.

\* \* \* \* \*